United States Patent [19]
Steffens, Jr.

[11] Patent Number: 5,485,970
[45] Date of Patent: Jan. 23, 1996

[54] SEAT BELT PRETENSIONER

[75] Inventor: Charles E. Steffens, Jr., Washington, Mich.

[73] Assignee: TRW Vehicle Safety Systems Inc., Lyndhurst, Ohio

[21] Appl. No.: 210,931

[22] Filed: Mar. 21, 1994

[51] Int. Cl.[6] .................................................. B60R 22/46
[52] U.S. Cl. ............................................................ 242/374
[58] Field of Search ........................... 242/374; 297/478, 297/480; 280/806

[56] References Cited

U.S. PATENT DOCUMENTS

| | | |
|---|---|---|
| 3,606,378 | 9/1971 | Prostran . |
| 4,014,479 | 3/1977 | Nilsson et al. ......................... 242/374 |
| 4,151,967 | 5/1979 | Lindblad ................................ 242/374 |
| 4,232,836 | 11/1980 | Fohl ....................................... 242/374 |
| 4,286,758 | 9/1981 | Inukai et al. . |
| 4,371,125 | 2/1983 | Andres . |
| 4,444,010 | 4/1984 | Bendler . |
| 4,455,000 | 6/1984 | Nilsson ................................. 242/374 |
| 4,508,288 | 4/1985 | Nilsson ................................. 242/374 |
| 4,558,832 | 12/1985 | Nilsson . |
| 4,840,325 | 6/1989 | Higuchi et al. . |
| 4,871,131 | 10/1989 | Bernier et al. . |
| 5,248,110 | 9/1993 | Hiruta et al. ......................... 242/374 |

FOREIGN PATENT DOCUMENTS 2505626  8/1976  Germany ............................. 242/374

OTHER PUBLICATIONS

Pipe, "Principles of the Wankel Engine", 1974, pp. 1–112, Indianapolis, Ind.

Primary Examiner—John P. Darling
Attorney, Agent, or Firm—Tarolli, Sundheim & Covell

[57] ABSTRACT

An apparatus (10) for tensioning belt webbing (14) around an occupant of a vehicle to restrain movement of the occupant includes a rotary trochoidal motor (40). The motor (40) includes a housing (44) having a wall with an inner surface (46) defining a chamber (48). A rotor (42) is rotatable in the chamber and has fluid engagement surfaces (50, 52, 54). An output shaft (66) is supported for rotation relative to the housing (44). A fluid source (80) is actuatable to supply fluid under pressure into the chamber (48) and against the fluid engagement surfaces (50, 52, 54) of the rotor (42) to rotate the rotor in a first direction of rotation in the chamber to thereby rotate the output shaft (66). A belt webbing engagement member (22) is engageable with the belt webbing (14) to tension the belt webbing. The output shaft (66) is interconnected with the belt webbing engagement member (22) to transmit force from the rotating output shaft to the belt webbing engagement member to tension the belt webbing (14).

19 Claims, 6 Drawing Sheets

SEAT BELT PRETENSIONER

BACKGROUND OF THE INVENTION

The present invention relates to a vehicle occupant restraint and, in particular, to a pretensioner for taking up slack in a seat belt in the event of a vehicle collision.

DESCRIPTION OF THE PRIOR ART

Some vehicle occupant restraint systems use seat belt webbing to restrain movement of a vehicle occupant. It is known to use a pretensioner in such a system. In the event of sudden vehicle deceleration above a predetermined threshold, such as occurs in a vehicle collision, the pretensioner is actuated to tension the belt webbing and to take up slack in the belt webbing.

It is known to use a pyrotechnic device in a seat belt pretensioner. Upon actuation, the pyrotechnic device directs fluid under pressure against a movable member to rotate a belt webbing retractor spool in a belt retraction direction. The belt webbing is wound on the spool, to pull the belt webbing against the occupant and minimize slack in the belt webbing.

SUMMARY OF THE INVENTION

The present invention is an apparatus for tensioning belt webbing to restrain movement of a vehicle occupant. The apparatus includes a rotary trochoidal motor comprising a housing having a wall with inner surfaces defining a chamber, a rotor rotatable in the chamber and having a fluid engagement surface, an output shaft supported for rotation relative to the housing, and means for transmitting rotational force from the rotor to the output shaft to rotate the output shaft. A fluid source is actuatable to supply fluid under pressure into the chamber and against the fluid engagement surface of the rotor to rotate the rotor in a first direction of rotation in the chamber to rotate the output shaft. A belt webbing engagement member is engageable with the belt webbing to tension the belt webbing. The output shaft is interconnected with the belt webbing engagement member to transmit force from the rotating output shaft to the belt webbing engagement member to tension the belt webbing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
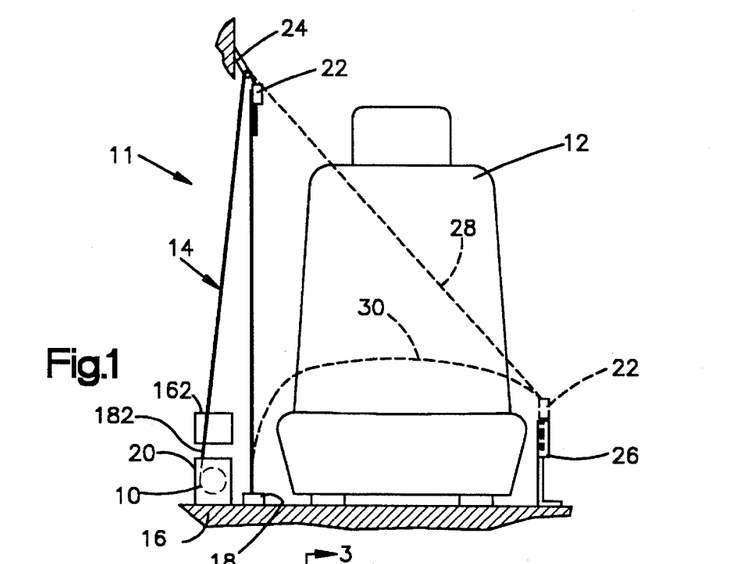
FIG. 1 is a schematic illustration of a vehicle seat belt system including a seat belt webbing retractor and a pretensioner in accordance with the present invention.

The present invention relates to a vehicle occupant restraint, and in particular, to a pretensioner for taking up slack in a seat belt in the event of vehicle deceleration above a predetermined threshold. The present invention is applicable to various seat belt pretensioner constructions. As representative of the present invention, FIG. 1 illustrates a pretensioner 10. The pretensioner 10 is incorporated in a three-point continuous loop seat belt system 11 for use in restraining an occupant of a vehicle.

During operation of the vehicle, an occupant of the vehicle sits on a seat 12 which is illustrated as a front passenger seat in the vehicle. A length of belt webbing 14 is extensible about the vehicle occupant. One end of the length of belt webbing 14 is anchored to the vehicle body 16 at an anchor point 18. The opposite end of the belt webbing 14 is attached to a retractor 20 secured to the vehicle body. Intermediate its ends, the belt webbing 14 passes through a tongue assembly 22 and a D-ring 24. When the seat belt system 11 is not in use, the belt webbing 14 is wound on the retractor 20 and is oriented generally vertically on one side of the seat 12, as shown in solid lines in FIG. 1.

To engage the seat belt system 11, the tongue assembly 22 is manually grasped and is pulled across the lap and torso of the occupant sitting in the seat 12. As the tongue assembly 22 is pulled across the lap and torso of the occupant, the tongue assembly moves along the belt webbing 14, and the belt webbing 14 is unwound from the retractor 20. When the belt webbing 14 has been pulled across the lap and torso of the occupant, the tongue assembly 22 is connected with a buckle 26, as shown in dashed lines in FIG. 1. The buckle 26 is connected to the vehicle body 16 and is disposed on the side of the seat 12 opposite the anchor point 18. When the seat belt system 11 is thus buckled, the length of belt webbing 14 is divided by the tongue assembly 22 into a torso portion 28 which extends across the torso of the occupant and a lap portion 30 which extends across the lap of the occupant.

Figure 2:
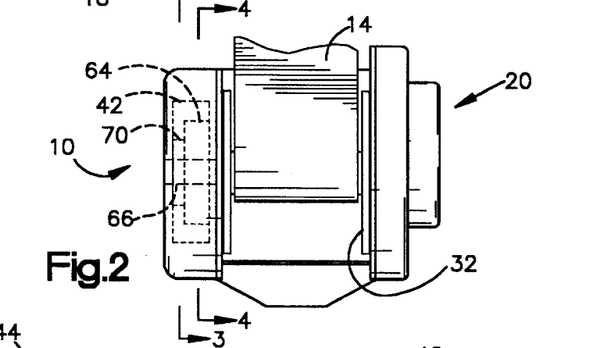
FIG. 2 is a pictorial view of the retractor and pretensioner of FIG. 1.
Figure 3:
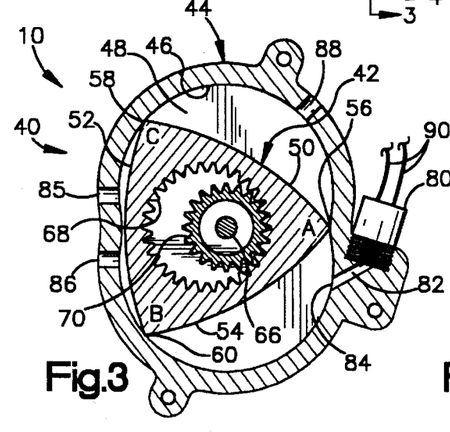
FIG. 3 is a sectional view through the pretensioner of FIG. 2 taken along line 3—3 of FIG. 2.

The pretensioner 10 (FIGS. 2 and 3) is associated with the retractor 20 for, when actuated, rotating a spool 32 of the retractor in a belt retraction direction to tension the belt webbing 14. The pretensioner 10 includes a rotary trochoidal motor 40 (FIG. 3). The motor 40 has a three-lobed rotor 42 which rotates and orbits within a housing 44. The housing 44 has an inner surface 46 with an epitrochoidal configuration. The housing inner surface 46 defines a pressure chamber 48 in the housing 44.

The rotor 42 is disposed within the pressure chamber 48. The rotor 42 divides the pressure chamber 48 into three chamber portions which vary in size as the rotor moves relative to the housing 12. Shaped generally like an equilateral triangle, the rotor 42 has three curved faces 50, 52, and 54 separated by three apexes 56, 58, and 60. The rotor 42 also has an internal bearing surface 62 (FIG. 4) by which the rotor is journalled for rotation on an eccentric lobe or cam 64. An output shaft 66 is fixed for rotation with the cam 64. The output shaft 66 is journalled for rotation in the housing 44.

A circular ring gear 68 is disposed on the inner periphery of the rotor 42 at a location spaced axially from the bearing surface 62. The ring gear 68 meshes with a circular stationary gear 70 fixed to the rotor housing 44. The axis 72 of the output shaft 66 is coincident with the center of the stationary gear 70. The stationary gear 70 has two-thirds as many teeth as the ring gear 68. As the rotor 42 rotates and orbits within the housing 44, the rotor apexes stay in contact with the epitrochoidal surface 46.

The motor 40 includes means 80 for supplying fluid under pressure into the pressure chamber 48. The fluid supply means may be a stored gas container. In a preferred embodiment, the fluid supply means is a pyrotechnic device 80 of a known type suitable for use in a pretensioning assembly. The pyrotechnic device 80, when actuated, directs fluid under pressure into the pressure chamber 48. The fluid is directed and metered through a pressure inlet passage 82 and an inlet port 84 into the pressure chamber 48.

Figure 5A:
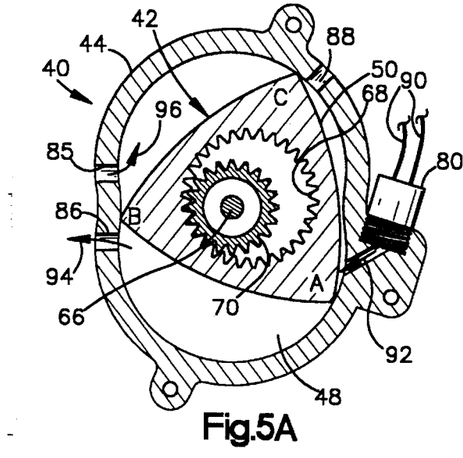
FIGS. 5A, 5B, 5C, 5D and 5E are a series of views illustrating the operation of the rotary trochoidal motor of the pretensioner.
Figure 5B:
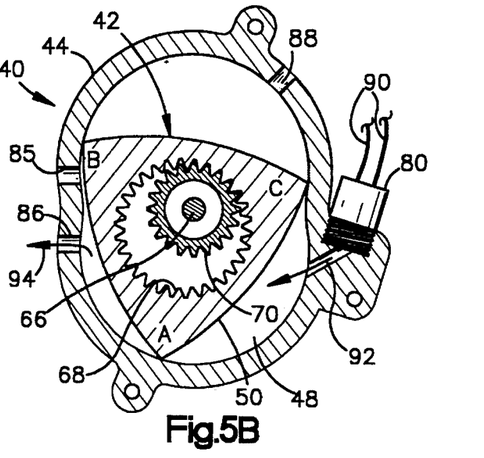
Figure 5C:
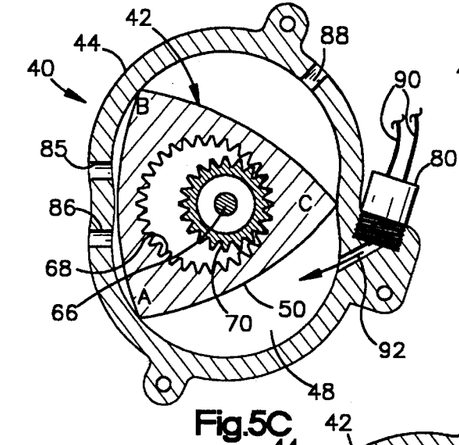
Figure 5D:
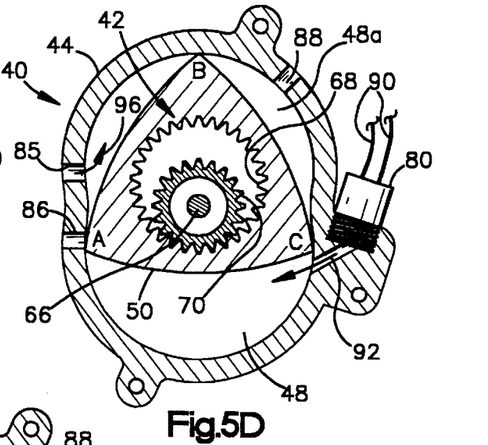
Figure 5E:
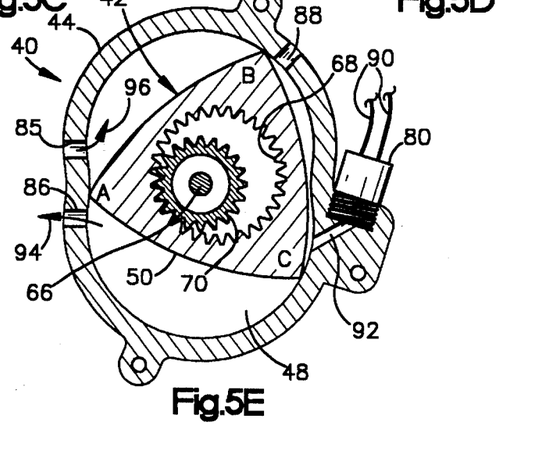

In the event of vehicle deceleration exceeding a predetermined deceleration, electric circuitry (not shown) directs an electrical signal over lead wires 90 to the pyrotechnic device 80. The pyrotechnic device 80 is actuated and produces fluid under pressure. The fluid under pressure flows through the inlet passage 82 and the inlet port 84 into the pressure chamber 48 of the pretensioner motor 40, as indicated by the arrow 92 in FIG. 5A.

The fluid impacts upon the rotor face 50, causing the rotor 42 to rotate in a generally clockwise direction as viewed in FIGS. 5A–5E. As the pyrotechnic device 80 continues to supply fluid under pressure into the pressure chamber 48 of the motor 40, the rotor 42 orbits and rotates continuously within the housing 44. The gas pressure on the rotor face receiving the pressurized fluid from the inlet port 84 overcomes the gas pressure on the other faces of the rotor 42.

As the rotor 42 rotates, ambient air flows through an inlet port 85 into the chamber 48 as indicated by the arrow 96. Fluid is exhausted from the chamber 48 through an exhaust port 86 as indicated by the arrow 96.

The force of the moving rotor 42 is transmitted through its bearing surface 62 to the output shaft cam 64, causing the output shaft 66 to rotate about its axis 72. As known in the prior art, each one-third of a rotation of the rotor 42 results in one full rotation of the output shaft 66. Thus, as illustrated in FIGS. 5A–5E, the output shaft 66 rotates once as the rotor 42 makes one-third of a rotation during its orbiting movement from the position shown in FIG. 5A to the position shown in FIG. 5E, passing through the intermediate positions shown in FIGS. 5B, 5C and 5D.

The motor 40 is not an internal combustion motor, although it is similar in construction to the known "Wankel" engine. Rather, the pressure of the fluid supplied by the pyrotechnic device 80 into the pressure chamber 48 results in movement of the rotor 42 and consequent rotation of the output shaft 66. There is no combustion or ignition within the motor 40, other than occurs upon the actuation of the pyrotechnic device 80. A passage 88, similar to the inlet port 85 and the exhaust port 86, enables fluid flow between the chamber portion marked 48a in FIG. 5D and the ambient atmosphere. Thus, there is no drag-inducing compression of fluid in the chamber portion 48a.

The output shaft 66 (FIGS. 2 and 3) of the motor 40 is connected for rotation with the retractor spool 32. Rotation of the motor output shaft 66, caused by the orbiting and rotational movement of the rotor 42 in response to actuation of the pyrotechnic device 80, results in rotation of the retractor spool 32 in a belt retraction direction, As the spool 32 rotates in the belt retraction direction, belt webbing 14 is wound onto the spool. This takes slack out of the seat belt system 11, tensioning the belt webbing 14 to restrain movement of the vehicle occupant.

As long as the fluid source 80 continues to supply fluid under pressure into the pressure chamber 48, the rotor 42 continues to rotate the output shaft 66. The pyrotechnic device 80, when actuated, supplies fluid under pressure for a finite period of time, preferably less than 30 milliseconds, rotating the retractor spool 32 in the belt retraction direction. When the pyrotechnic device stops supplying fluid under pressure, the motor 40 and its output shaft 66 no longer effect rotation of the retractor spool 32 in the belt retraction direction. Withdrawal of belt webbing 14 from the retractor spool 32 must then be prevented in some other manner.

Figure 6:
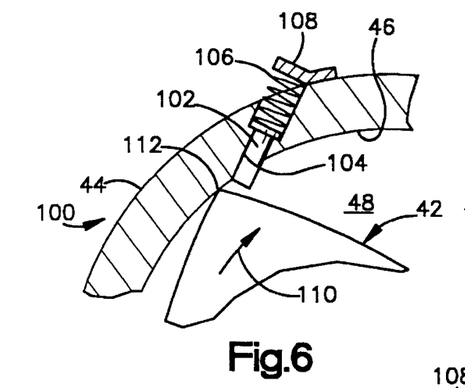
FIG. 6 illustrates a blocking mechanism for blocking reverse rotation of the motor of FIG. 5.
Figure 7:
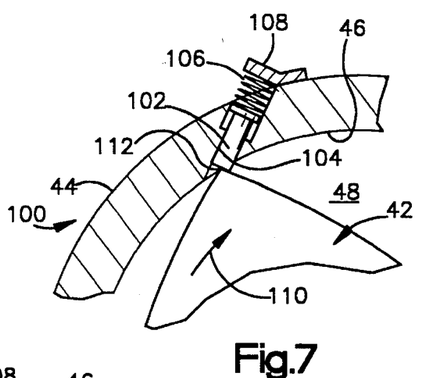
FIG. 7 is a view similar to FIG. 6 illustrating the blocking mechanism in a second condition.
Figure 8:
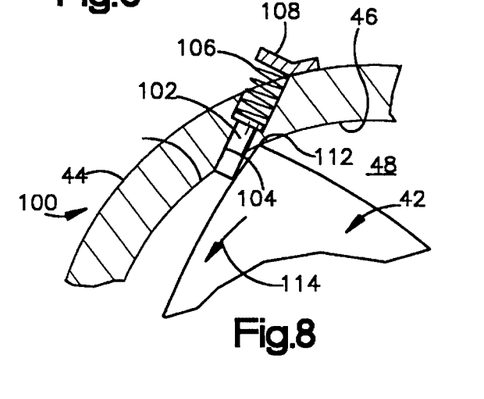
FIG. 8 is a view similar to FIG. 6 illustrating the blocking mechanism in a third condition.

A suitable blocking mechanism 100 is illustrated in FIGS. 6–8. The blocking mechanism 100 includes a rod 102 slidable in a bore 104 of the housing 44. A compression spring 106 acting between the rod 102 and a mounting member 108 biases the rod axially so that a portion of the rod projects inward into the pressure chamber 48 of the motor 40.

When the motor 40 is first actuated, the rotor 42 (FIG. 6) moves relative to the housing 44 in a first direction of movement as indicated by the arrow 110. When a moving apex of the rotor 42, as indicated by the reference numeral 112, engages the rod 102, the rod is moved outward into the housing bore 104, compressing the spring 106. The rotor apex 112 moves in the direction 110 past the blocking assembly 100. All of the apexes of the rotor 42 can in this manner pass the blocking mechanism 100 when the motor 40 is actuated, thereby allowing the pretensioner 10 to cause retraction of belt webbing 14.

If the rotor 42 rotates in the opposite direction 114 (FIG. 8), the rotor apex 112 engages the projecting portion of the rod 102. The rotor apex 112 cannot push the rod 102 out of the chamber 48 or move past the rod. Thus, movement of the rotor 42 in the direction 114 is prevented. Accordingly, seat belt webbing 14 can not be withdrawn from the retractor 20 because rotation of the retractor spool 32 in the belt withdrawal direction would result in movement of the rotor 42 in the direction 114. Since the blocking mechanism 100 blocks such movement of the rotor 42, the belt webbing 14, once tensioned by the pretensioner 10, will remain in that condition.

Figure 9:
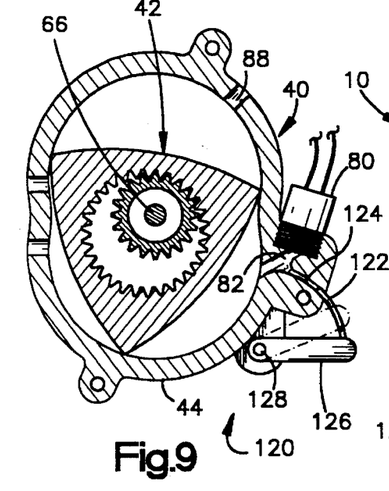
FIG. 9 illustrates a second type of blocking mechanism.
Figure 10:
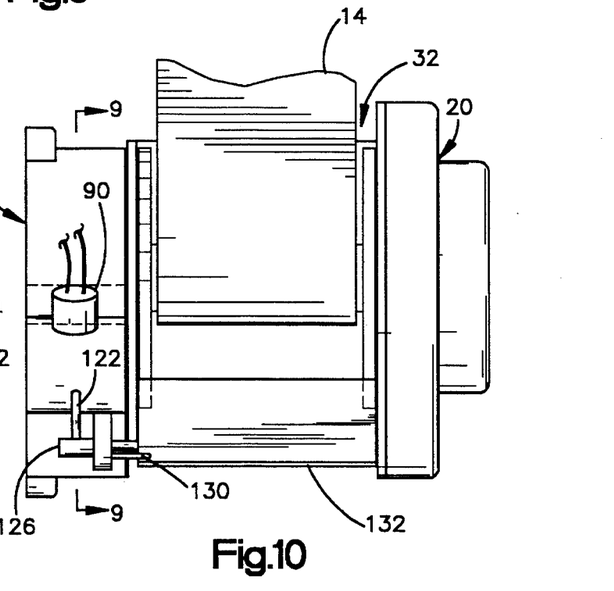
FIG. 10 is a elevational view of the blocking mechanism of FIG. 9.
Figure 11:
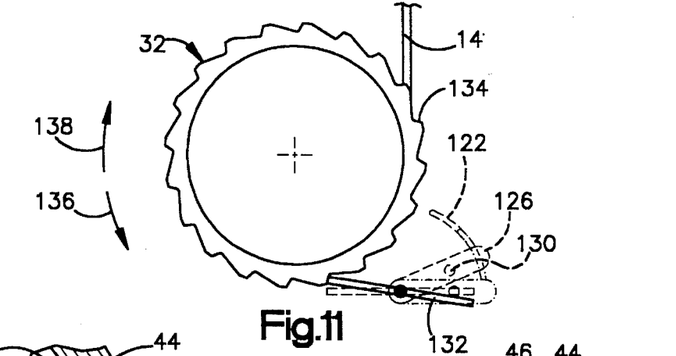
FIG. 11 is a schematic view illustrating operation of the blocking mechanism of FIG. 9.

FIGS. 9–11 illustrate a second type of blocking mechanism 120. The blocking mechanism 120 includes a piston 122 disposed in a secondary fluid passage 124 opening off the motor fluid inlet passage 82. The piston 122 is fixed for movement with a lever 126 pivotally mounted at 128 to the motor housing 44.

Upon actuation of the motor 40, fluid under pressure flows from the pyrotechnic device 80, through the fluid inlet passage 82, and into the secondary fluid passage 124. Pressure of the fluid in the secondary fluid passage 124 acts on the piston 122 to pivot the lever 126 from the position shown in dashed lines in FIG. 9 to the position shown in solid lines in FIG. 9. As the lever 126 pivots, a flexible axially-projecting finger 130 on the lever 126 (FIG. 11) moves a lock pawl 132 into engagement with a ratchet wheel 134 fixed for rotation with the retractor spool 32. Engagement of the lock pawl 132 with the ratchet wheel 134 blocks rotation of the spool 32 in the belt withdrawal direction 136 (FIG. 11), while permitting rotation of the ratchet wheel and spool in the belt retraction direction 138. Thus, the pretensioner 10 remains operable to wind belt webbing 14 onto the retractor spool 32 upon actuation of the motor 40, while the blocking mechanism 120 prevents withdrawal of belt webbing from the retractor 20 after the motor 40 has tensioned the belt webbing 14.

Figure 12:
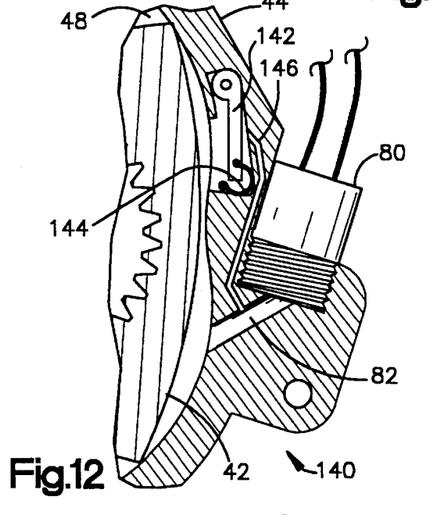
FIG. 12 illustrates a third type of blocking mechanism.
Figure 13:
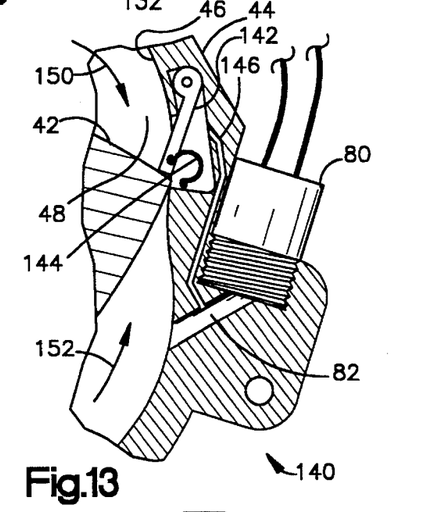
FIG. 13 illustrates operation of the blocking mechanism of FIG. 12.

FIGS. 12 and 13 illustrate a third type of blocking mechanism 140. The blocking mechanism 140 includes a pawl 142 mounted for pivotal movement relative to the housing 44. An overcenter spring 144 has one end connected with the housing 44 and its other end connected with the pawl 142. The overcenter spring 144 normally biases the pawl 142 into a position illustrated in FIG. 12 disposed out of the pressure chamber 48.

Upon actuation of the motor 40, the pyrotechnic device 80 directs fluid under pressure through the fluid inlet passage 82. A portion of this fluid flows through an interconnected passage 146 and contacts the pawl 142. The pressure of the fluid acting on the pawl 142 moves the pawl against the biasing effect of the overcenter spring 144, into an engaged position as shown in FIG. 13. When the pawl 142 is in the engaged position, a portion of the pawl projects into the pressure chamber 48 inside the housing 44. The overcenter spring 144 resiliently holds the pawl 142 in the engaged position.

When the rotor 42 rotates in the pretensioning or belt retraction direction 150, each moving rotor apex engages the pawl 142 and moves it out of the pressure chamber 48, against the biasing effect of the overcenter spring 144, enabling the rotor to pass the pawl 142. After the rotor apex moves past the pawl 142, the overcenter spring 144 moves the pawl back into the engaged position. This sequence repeats each time a rotor apex moves in the belt retraction direction 150 into engagement with the pawl 142.

Rotation of the rotor 42 in a belt withdrawal direction 152 is blocked by engagement of the rotor with the engaged pawl 142, as shown in FIG. 13. This blocks rotation of the motor output shaft 66 in the same direction, and accordingly blocks rotation of the retractor spool 32 in that direction also. This blocks withdrawal of belt webbing from the retractor 20, thus continuing to restrain forward movement of the vehicle occupant relative to the vehicle seat 12.

Figure 14:
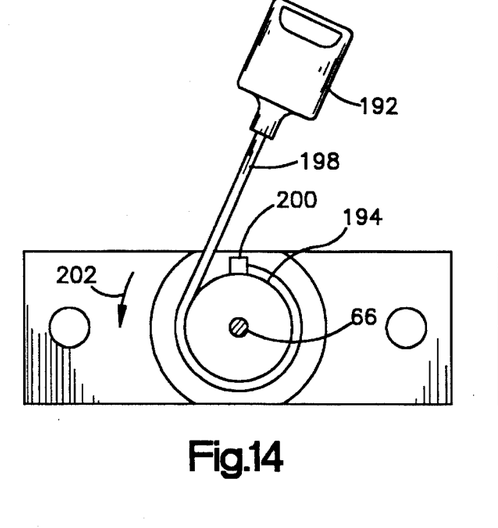
FIG. 14 illustrates a seat belt buckle assembly including a pretensioner in accordance with the present invention.
Figure 15:
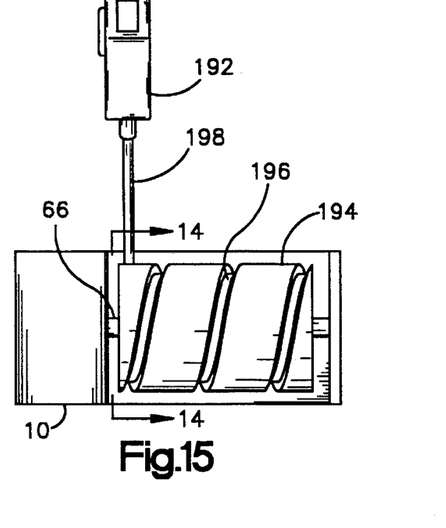
FIG. 15 is an elevational view of the assembly of FIG. 14.

FIGS. 14 and 15 illustrate the use of the pretensioner 10 to move a seat belt buckle 192 in a direction to tension belt webbing connected to the buckle. The output shaft 66 of the pretensioner 10 is fixed for rotation with a drum 194 having a spiral groove 196. A buckle support cable 198 is fixed by a cable end connector 200 to the drum 194.

Upon actuation of the pretensioner 10, the output shaft 66 rotates the drum 194 in a belt tensioning direction as indicated by the arrow 202 in FIG. 14. As the drum 194 rotates, the buckle support cable 198 is wound in the spiral groove 196 on the drum. As the cable 198 is wound on the drum 194, the buckle 192 is drawn closer to the drum 194. This movement of the buckle 192 tensions belt webbing connected with the buckle 192, to restrain forward movement of a vehicle occupant.

Figure 16:
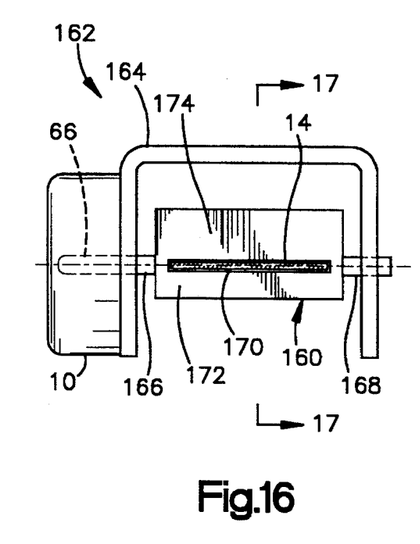
FIG. 16 illustrates a web grabber assembly including a pretensioner in accordance with the present invention.
Figure 17:
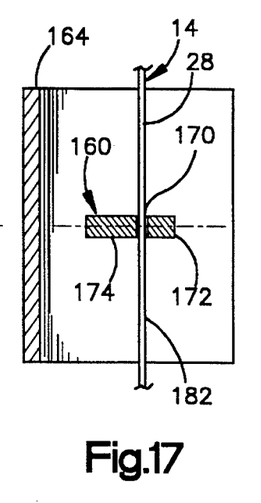
FIG. 17 is a sectional view taken along line 17—17 of FIG. 16.
Figure 18:
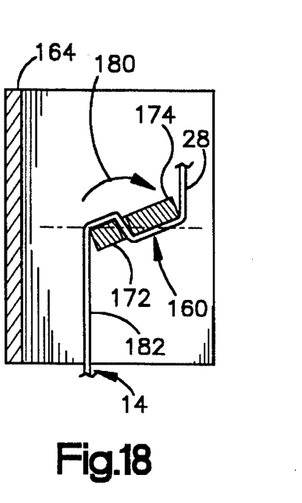
FIG. 18 is a view similar to FIG. 17 showing the web grabber in an actuated condition.

In the embodiment of the invention illustrated in FIGS. 16–18, the output shaft 66 of the pretensioner 10 is connected for rotational movement with a web grabber 160. The web grabber 160 is part of a web grabber assembly 162 which is disposed in a position as illustrated schematically in FIG. 1 intermediate the shoulder belt portion 28 of the belt webbing 14 and the retractor 20.

The web grabber assembly 162 includes a frame 164 fixed to the vehicle body 16 in a manner not shown. The pretensioner 10 is mounted on the frame 164. The web grabber 160 is supported on shafts 166 and 168 for rotation relative to the frame 164. The shaft 166 is coupled for rotational movement with the output shaft 66 of the pretensioner 10.

A slot 170 in the web grabber 160 divides the web grabber into a shorter portion 172 and a longer portion 174. The belt webbing 14 extends through the slot 170 and the web grabber 160. The web grabber 160 may be coated with a soft plastic material to enhance gripping.

FIG. 17 illustrates the web grabber assembly 162 in an unactuated condition. The belt webbing 14 extends vertically through the slot 170 in the web grabber 160. The belt webbing 14 is movable freely through the slot 170.

Upon actuation of the pretensioner 10, the motor output shaft 66 rotates in a belt retraction direction 180 (FIG. 18). The web grabber 160 also rotates in the belt retraction direction 180. As the web grabber 160 rotates, the shorter portion 172 of the web grabber draws belt webbing 182 from the retractor 20. Simultaneously, the longer portion 174 of the web grabber 160 draws shoulder belt webbing 28. Belt webbing from the shoulder belt portion 28 of the seat belt system 11 is drawn into the web grabber assembly 162 at a faster rate than is the belt webbing 182 from the retractor 20. The drawing of the belt webbing 28 into the web grabber assembly 162 tensions the belt webbing about the vehicle occupant, restraining forward movement of the occupant relative to the vehicle seat 12.

Figure 19:
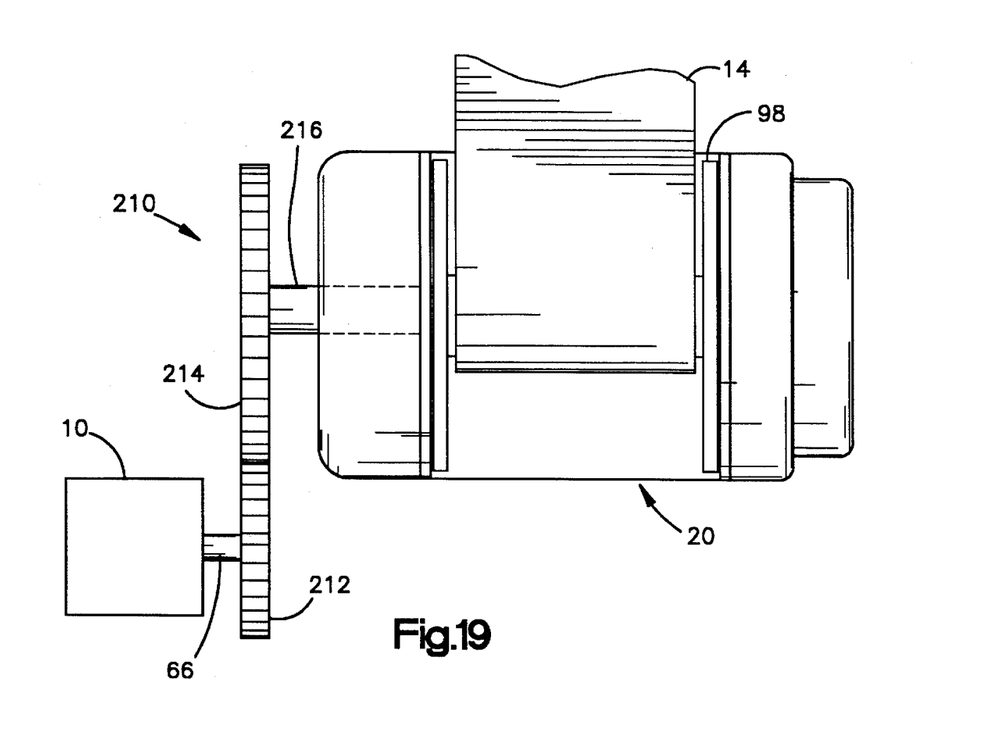
FIG. 19 is a pictorial view illustrating a geared connection between a pretensioner in accordance with the present invention and a seat belt retractor.

In an alternate embodiment of the invention, illustrated in FIG. 19, a gear drive assembly 210 transmits the output of the pretensioner 10 to the spool of the retractor 20. The gear drive assembly 210 includes a first spur gear 212 connected for rotation with the output shaft 66 of the pretensioner 10. The gear assembly 210 also includes a second spur gear 214 which meshes with the gear 212. The gear 214 is fixed for rotation with a shaft 216. The shaft 216 is coupled for rotation with the retractor spool 32 of the retractor 20.

Upon actuation of the pretensioner 10, the rotational movement of the output shaft 66 is transmitted through the spur gears 212 and 214 to the shaft 216. The shaft 216 rotates the retractor spool 32 in the belt withdrawal direction. Rotation of the spool 32 in the belt withdrawal direction winds belt webbing 14 on the spool of the retractor 20. This tensions the belt webbing extended about the vehicle occupant, restraining forward movement of the vehicle occupant relative to the vehicle seat 12.

Figures 20, 21:
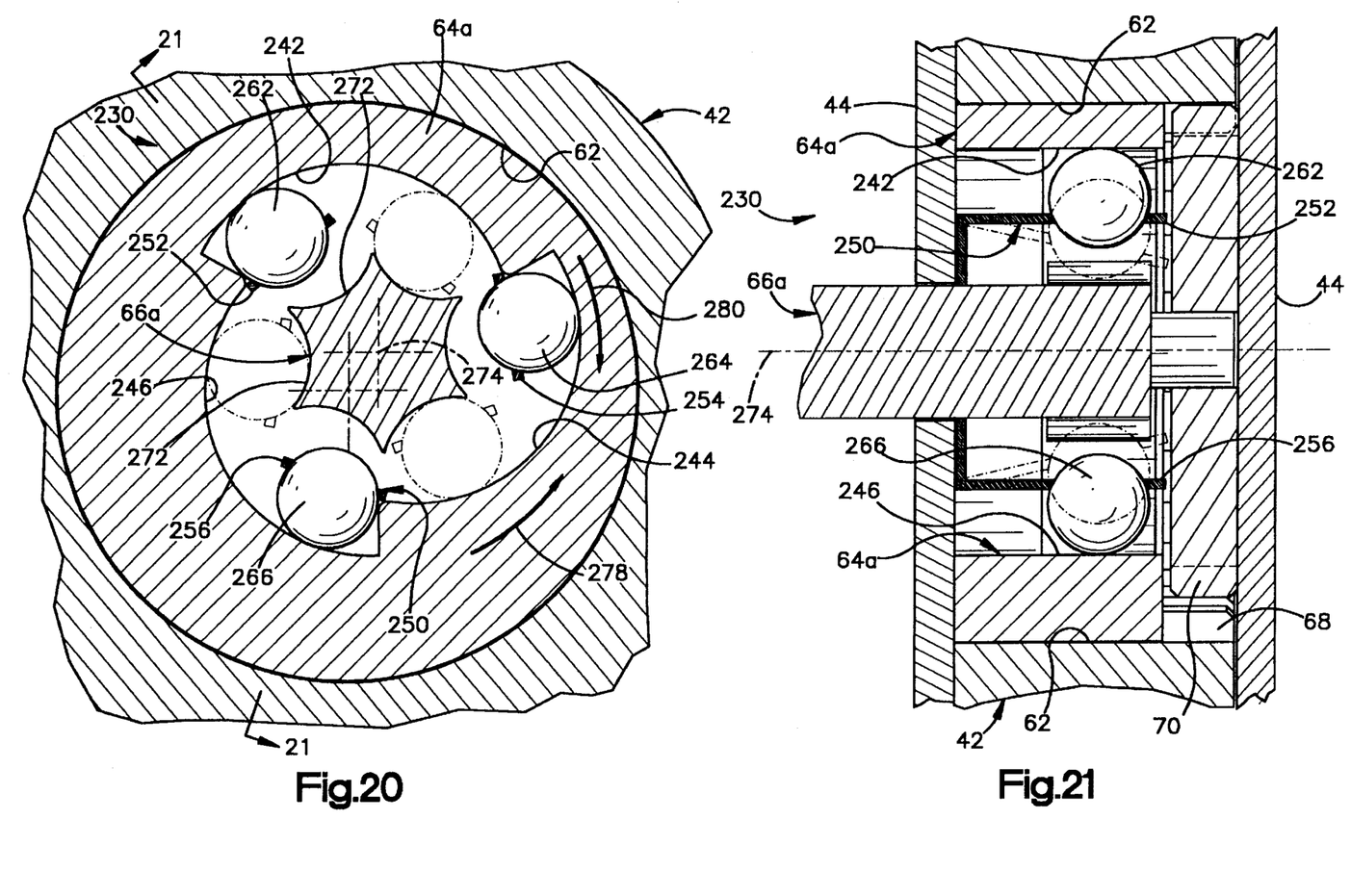
FIG. 20 illustrates a clutch assembly for use with a pretensioner in accordance with the present invention.
FIG. 21 is a sectional view taken along line 21—21 of FIG. 20.

If the pretensioner output shaft is normally connected for rotation with a retractor spool, then rotation of the retractor spool causes rotation of the parts of the pretensioner 10 including the rotor 42. This can place unwanted drag on the retractor. FIGS. 20 and 21 illustrate a clutch assembly 230 which can be used when it is desired that the pretensioner output shaft normally be disengaged from a retractor spool or other belt tensioning device.

Figure 4:
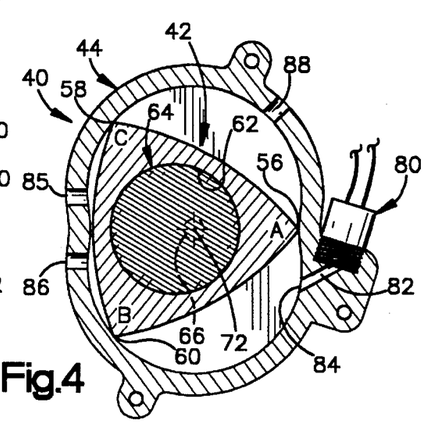
FIG. 4 is a view taken along line 4—4 of FIG. 2.

In the clutch assembly 230, the output shaft is not fixed for rotation with the cam (as in the embodiment of FIGS. 3 and 4). Instead, the clutch assembly 230 includes an output shaft 66a and cam 64a which are rotatable relative to each other. The clutch assembly 230 enables selective coupling of the output shaft 66a for rotation with the cam 64, as discussed below.

In the clutch assembly 230, the cam 64a has three cam surfaces 242, 244, and 246 on its inner periphery. A resilient deflection member 250 is frictionally coupled to the housing 44 and does not rotate relative to the housing when the clutch assembly 230 is in the disengaged condition shown in solid lines in FIGS. 20 and 21. The deflection member 250 rotates with the cam 64a, relative to the housing 44, when the clutch assembly 230 is in the engaged condition.

The deflection member 250 includes three pairs of axially-extending fingers 252, 254, and 256. The deflection member fingers 252 bias a first clutch element 262 radially outwardly against the cam surface 242. Similarly, the deflection member fingers 254 bias a second clutch element 264 radially outwardly against the cam surface 244; and the deflection member fingers 256 bias a third clutch element 266 radially outwardly against the cam surface 246.

The clutch elements 262, 264, and 266, when in the radially outward position shown in solid lines in FIGS. 20 and 21, are spaced away from the output shaft 66a. The output shaft 66a has a fluted cross sectional configuration as defined by a series of axially-extending arcuate recesses 272. In the embodiment shown, the output shaft 66a has six recesses 272 spaced equally about an axis 274 of the shaft.

The clutch assembly 230 is normally in the disengaged condition shown in solid lines in FIGS. 20 and 21. The output shaft 66a is free to rotate within the clutch assembly 230 without engagement with any other parts of the clutch assembly. Specifically, the output shaft 66a can rotate in a belt retraction direction as indicated by the arrow 278 in FIG. 20, and in an opposite belt withdrawal direction as indicated by the arrow 280. Therefore, the output shaft 66a can be directly coupled for rotation with a spool (not shown) of a seat belt retractor, without placing unwanted drag on the retractor spool.

In the event of vehicle deceleration exceeding a predetermined deceleration, the pretensioner rotor 42 orbits and rotates in the belt retraction direction 278. This orbiting movement of the rotor 42 in the belt retraction direction 278 results in movement of the cam 64a in the same direction about the axis 274.

As the cam 64a moves in the belt retraction direction 278, the cam surfaces 242, 244, and 246 on the cam force the clutch elements 262, 264, and 266 to move radially inwardly into respective recesses 272 of the output shaft 66a, as shown in dot-dash lines in FIGS. 20 and 21. When the clutch elements 262, 264, and 266 are in engagement with the output shaft 66a, they transmit to the output shaft the rotational force of the cam 64a. Thus, as the rotor 42 continues to move in the belt retraction direction 278, the cam 64a causes the output shaft 66a to rotate in the belt retraction direction also. Rotation of the output shaft 66a in the belt retraction direction 278 results in the winding of belt webbing on the retractor spool, to pretension the belt webbing and restrain movement of the vehicle occupant.

When the rotor 42 is no longer driven to rotate in the belt retraction direction 278, the output shaft 66a can rotate in the belt withdrawal direction 280. The deflection member 250 moves the clutch elements 262, 264, and 266 radially outward away from the output shaft 66a. The clutch assembly 230 thus returns to in the disengaged position shown in solid lines in FIG. 20 and 21, in which the output shaft 66a is free to rotate in either direction relative to the rotor 42.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for tensioning belt webbing to restrain movement of a vehicle occupant, said apparatus comprising:

a rotary trochoidal motor comprising a housing having a wall with an inner surface defining a chamber, a rotor rotatable and orbitable in said chamber about an axis and having a fluid engagement surface, an output shaft supported for rotation relative to said housing, and means for transmitting rotational force from said rotor to said output shaft to rotate said output shaft;

a fluid source actuatable to supply fluid under pressure;

means for metering and directing fluid under pressure from said fluid source when actuated into said chamber and against said fluid engagement surface of said rotor to rotate said rotor in a first direction of rotation in said chamber and thereby to rotate said output shaft;

a belt webbing engagement member engageable with the belt webbing to tension the belt webbing; and means for interconnecting said output shaft with said belt webbing engagement member to transmit force from said rotating output shaft to said belt webbing engagement member to tension the belt webbing.

2. An apparatus as set forth in claim 1 wherein said belt webbing engagement member comprises a spool on which the belt webbing is windable, said means for interconnecting said output shaft with said belt webbing engagement member comprising means for coupling said spool for rotation with said output shaft.

3. An apparatus as set forth in claim 1 wherein said seat belt webbing engagement member comprises a buckle assembly connected with the seat belt webbing and having a flexible member connected therewith, said means for interconnecting said output shaft with said belt webbing engagement member comprising a drum rotatable with said output shaft for winding the flexible member on said drum to tension the belt webbing.

4. An apparatus as set forth in claim 1 wherein said belt webbing engagement member comprises a web grabber having an opening through which the belt webbing is extensible, said web grabber being rotatable between a first position in which the belt webbing is movable through said web grabber and a second position in which the belt webbing is wound on said web grabber to tension the belt webbing, said means for interconnecting said output shaft with said belt webbing engagement member comprising means for coupling said web grabber for rotation with said output shaft to tension the belt webbing.

5. An apparatus as set forth in claim 4 wherein said web grabber includes a shorter portion and a longer portion spaced about said opening in said web grabber, said longer portion drawing belt webbing into a wound position on said web grabber at a faster rate than said shorter portion upon actuation of said fluid source.

6. An apparatus as set forth in claim 1 wherein said means for transmitting rotational force from said rotor to said output shaft comprises:

a clutch movable between a disengaged condition blocking transmission of force from said rotor to said output shaft and an engaged condition transmitting force from said rotor to said output shaft to tension the belt webbing; and means responsive to the actuation of said fluid pressure source for moving said clutch from the disengaged condition to the engaged condition.

7. An apparatus as set forth in claim 6 wherein said belt webbing engagement member comprises a spool on which the belt webbing is windable, said clutch comprising means for coupling said spool for rotation with said rotor.

8. An apparatus as set forth in claim 7 wherein said means for coupling comprises a cam rotatable with said rotor and a coupling element movable into engagement with said output shaft by said cam to couple said output shaft and thereby said spool for rotation with said rotor.

9. An apparatus as set forth in claim 1 wherein said fluid source comprises a pyrotechnic device actuatable to generate fluid under pressure over a period of time less than thirty milliseconds, said means for directing fluid under pressure comprising a fluid passage in said housing extending between said pyrotechnic device and said chamber and having an opening into said chamber, said fluid passage directing fluid under pressure from said pyrotechnic device when actuated into said chamber to rotate said rotor in the first direction of rotation in said chamber.

10. An apparatus as set forth in claim 1 wherein said fluid source comprises a container and a source of gas under pressure in said container, said means for metering and directing fluid under pressure comprising a fluid passage in said housing extending between said container and said chamber and having an opening into said chamber, said fluid passage directing gas under pressure from said container into said chamber to rotate said rotor in the first direction of rotation in said chamber.

11. An apparatus for tensioning belt webbing to restrain movement of a vehicle occupant, said apparatus comprising:

a rotary trochoidal motor comprising a housing having a wall with an inner surface defining a chamber, a rotor rotatable in said chamber and having a fluid engagement surface, an output shaft supported for rotation relative to said housing, and means for transmitting rotational force from said rotor to said output shaft to rotate said output shaft;

a fluid source actuatable to supply fluid under pressure;

means for metering and directing fluid under pressure from said fluid source when actuated into said chamber and against said fluid engagement surface of said rotor to rotate said rotor in a first direction of rotation in said chamber and thereby to rotate said output shaft;

a belt webbing engagement member engageable with the belt webbing to tension the belt webbing; and means for interconnecting said output shaft with said belt webbing engagement member to transmit force from said rotating output shaft to said belt webbing engagement member to tension the belt webbing;

said belt webbing engagement member comprising a spool on which the belt webbing is windable, said means for interconnecting said output shaft with said belt webbing engagement member comprising a first gear rotatable with said output shaft and a second gear in meshing engagement with said first gear and rotatable with said spool.

12. An apparatus for tensioning belt webbing to restrain movement of a vehicle occupant, said apparatus comprising:

a rotary trochoidal motor comprising a housing having a wall with an inner surface defining a chamber, a rotor rotatable in said chamber and having a fluid engagement surface, an output shaft supported for rotation relative to said housing, and means for transmitting rotational force from said rotor to said output shaft to rotate said output shaft;

a fluid source actuatable to supply fluid under pressure;

means for metering and directing fluid under pressure from said fluid source when actuated into said chamber and against said fluid engagement surface of said rotor to rotate said rotor in a first direction of rotation in said chamber and thereby to rotate said output shaft;

a belt webbing engagement member engageable with the belt webbing to tension the belt webbing;

means for interconnecting said output shaft with said belt webbing engagement member to transmit force from said rotating output shaft to said belt webbing engagement member to tension the belt webbing; and means connected with said housing for blocking rotation of said rotor in said chamber in a second direction of rotation opposite to said first direction of rotation.

13. An apparatus as set forth in claim 12 wherein said means for blocking rotation of said rotor comprises a lock lever supported on said housing for movement between a first position blocking rotation of said rotor in the second direction of rotation and a second position enabling rotation of said rotor in the second direction of rotation.

14. An apparatus as set forth in claim 13 including biasing means for biasing said lock lever into the first position blocking rotation of said rotor in the second direction of rotation, said lock lever being movable against the biasing effect of said biasing means into the second position enabling rotation of said rotor in the second direction of rotation.

15. An apparatus as set forth in claim 13 including an overcenter spring having a first condition biasing said lock lever into the first position blocking rotation of said rotor in the second direction of rotation and a second condition biasing said lock lever into the second position enabling rotation of said rotor in the second direction of rotation.

16. An apparatus as set forth in claim 13 further comprising means for directing fluid under pressure from said fluid pressure source to move said lock lever from the second position to the first position.

17. An apparatus as set forth in claim 12 wherein said belt webbing engagement member comprises a spool on which the belt webbing is windable, a ratchet wheel connected for rotation with said spool, said means for blocking rotation of said rotor in the second direction of rotation comprising a lock pawl movable into engagement with said ratchet wheel to block rotation of said spool in a belt withdrawal direction and means responsive to the actuation of said fluid pressure source for moving said lock pawl into engagement with said ratchet wheel.

18. An apparatus as set forth in claim 17 wherein said means responsive to the actuation of said fluid pressure source for moving said lock pawl into engagement with said ratchet wheel comprises:

a flexible member engageable with said lock pawl and movable into an engagement position to move and hold said lock pawl into engagement with said ratchet wheel to block rotation of said spool in the belt withdrawal direction and to enable rotation of said spool in an opposite belt retraction direction; and fluid passage means for directing fluid under pressure from said actuated fluid pressure source to move said member into the engagement position to move said lock pawl into engagement with said ratchet wheel.

19. An apparatus for tensioning belt webbing to restrain movement of a vehicle occupant, said apparatus comprising:

a rotary trochoidal motor comprising a housing having a wall with an inner surface defining a chamber, a rotor rotatable in said chamber and having a fluid engagement surface, an output shaft supported for rotation relative to said housing, and means for transmitting rotational force from said rotor to said output shaft to rotate said output shaft;

a fluid source actuatable to supply fluid under pressure;

means for metering and directing fluid under pressure from said fluid source when actuated into said chamber and against said fluid engagement surface of said rotor to rotate said rotor in a first direction of rotation in said chamber and thereby to rotate said output shaft;

a belt webbing engagement member engageable with the belt webbing to tension the belt webbing; and means for interconnecting said output shaft with said belt webbing engagement member to transmit force from said rotating output shaft to said belt webbing engagement member to tension the belt webbing;

said chamber having an epitrochoidal configuration defined by said housing inner wall surface, said rotor being generally triangular in configuration and having three fluid engagement surfaces including said fluid engagement surface, said means for directing fluid under pressure into said chamber and against said fluid engagement surface of said rotor comprising an inlet port at a fixed location in said housing wall.

* * * * *